Sept. 7, 1948.　　　　S. D. LIVINGSTON　　　　2,448,897
SURGE GENERATOR

Filed Dec. 31, 1946　　　　　　　　　　　　　5 Sheets-Sheet 1

Fig. 1.

INVENTOR.
STANLEY D. LIVINGSTON
BY
Lyman E. Dodge
ATTORNEY

Sept. 7, 1948.  S. D. LIVINGSTON  2,448,897
SURGE GENERATOR
Filed Dec. 31, 1946  5 Sheets-Sheet 2

INVENTOR.
STANLEY D. LIVINGSTON
BY
Lyman E. Dodge
ATTORNEY

Sept. 7, 1948.  S. D. LIVINGSTON  2,448,897
SURGE GENERATOR
Filed Dec. 31, 1946  5 Sheets-Sheet 3

INVENTOR.
STANLEY D. LIVINGSTON
BY
Lyman E. Dodge
ATTORNEY

Sept. 7, 1948.     S. D. LIVINGSTON     2,448,897
SURGE GENERATOR
Filed Dec. 31, 1946     5 Sheets-Sheet 4

INVENTOR.
STANLEY D. LIVINGSTON
BY
Lyman E. Dodge
ATTORNEY

Sept. 7, 1948.  S. D. LIVINGSTON  2,448,897
SURGE GENERATOR
Filed Dec. 31, 1946  5 Sheets-Sheet 5

INVENTOR.
STANLEY D. LIVINGSTON
BY
Lyman E. Dodge
ATTORNEY

Patented Sept. 7, 1948

2,448,897

UNITED STATES PATENT OFFICE 2,448,897

SURGE GENERATOR

Stanley D. Livingston, Freeport, N. Y.

Application December 31, 1946, Serial No. 719,389

6 Claims. (Cl. 171—209)

1

This invention relates to light production apparatus, particularly to a form adapted for use as an auxiliary to a camera and more especially to a form including a manually operable electrical generator.

A principal object of this invention is to provide a device for use in connection with a camera whereby a flash lamp may be flashed by means of an electric current generated following a manual setting of a device which is then tripped by a manual motion and in timed relation thereto the shutter of the camera is opened.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which, like characters of reference designate like parts throughout the several views, and in which.

Figure 1:
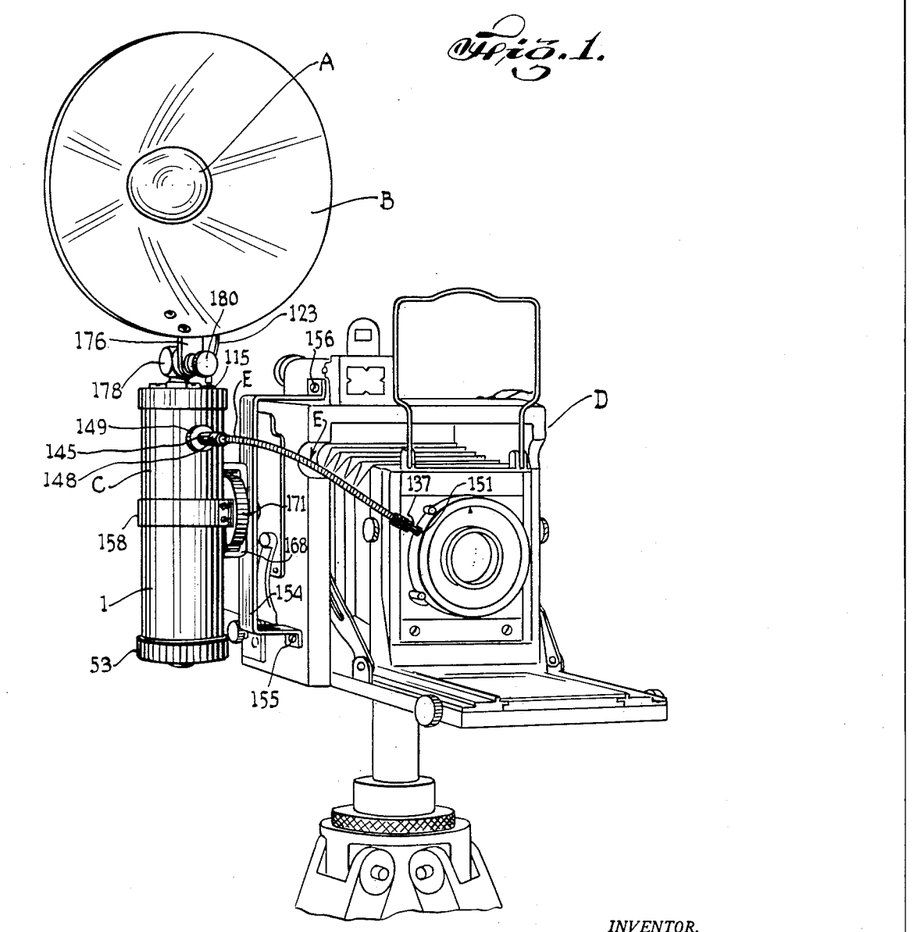
Fig. 1 is a somewhat perspective view of a conventional camera with a device of my invention attached thereto.

My invention, in a preferred form, may be considered as an auxiliary or attachment to a camera and, in preferred embodiment, simulates, in general outward appearance and size, well known devices adapted for use in connection with a camera for producing light and operating the camera shutter. The general appearance of the arrangement is shown by Fig. 1. A is a flash lamp properly positioned in a reflector B mounted on a cylindrical case C attached to the side of a camera D. A device E is provided for properly timed actuation of the shutter of the camera D in relation to the flash of the flash lamp A.

Devices for igniting flash lamps of a well known construction include a case comparable to C. In well known constructions, the case comparable to C is used to house electric batteries. In my construction, the case is used to house a manually operable electrical generator and means for causing the shutter of the camera to be opened at a proper time in relation to the flash of the lamp A.

Figures 2, 3, 4, 5:
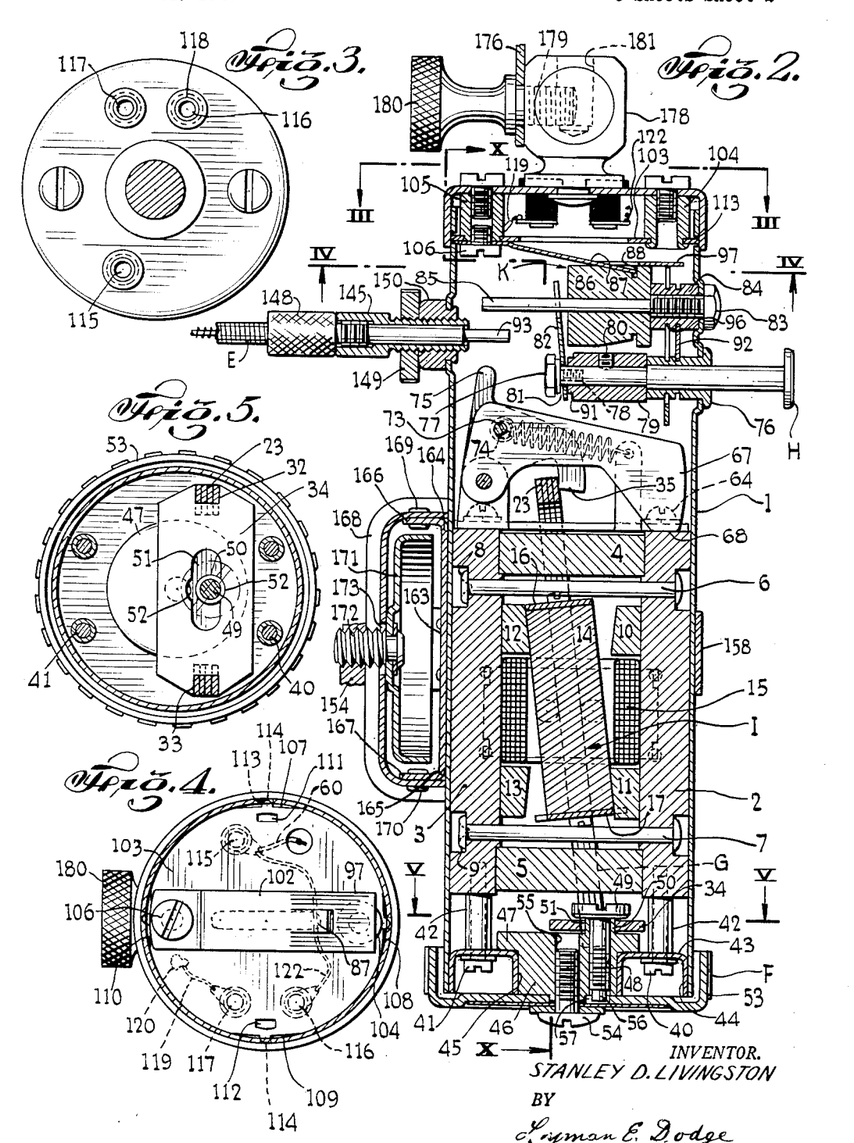
Fig. 2 is a longitudinal sectional view of a device embodying my invention.
Figs. 3, 4 and 5 are cross sectional views of the device as shown by Fig. 2 on the planes indicated by the lines III—III and IV—IV and V—V, respectively, viewed in the direction of the arrows at the ends of the lines.

The general construction of my electrical generator and its operative relation to the camera can be well understood by reference to Fig. 2. In this figure, F designates a knob which is operable manually to tension a spring G which, when released by the trigger pin H, actuates an armature I to generate a current which ignites the flash material in the flash lamp. The trigger pin H in conjunction with the timing mechanism K also actuates the shutter operating means E in properly timed relation to the maximum intensity of light produced by flash lamp A.

The main case or container 1 of my invention is preferably substantially in the form of a hollow cylinder, the wall of which is preferably of metal and preferably of stainless steel.

Figures 12, 13:
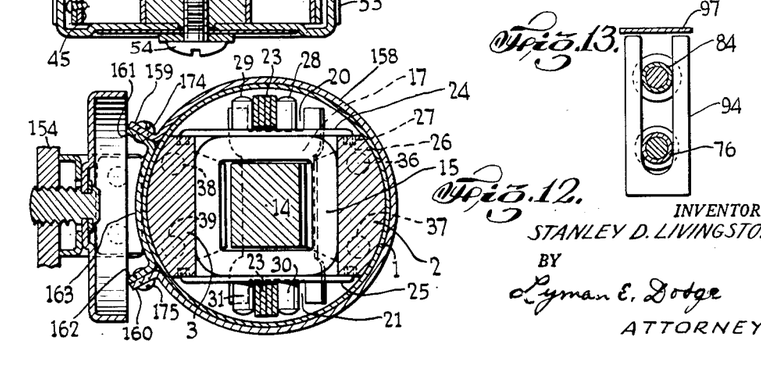
Figs. 12 and 13 are cross sectional views of the device as shown by Fig. 11 on the planes indicated by the lines XII—XII and XIII—XIII respectively, viewed in the direction of the arrows at the ends of the line.

Within the case 1, I position two pole pieces 2 and 3 of an electric generator. Each of these pole pieces has a curved outer surface, as best shown in Fig. 12, and each is made of such size that when spaced as intended, they fit nicely within the case 1 bearing against the inside surface thereof so that they are held from movement sideways.

My electric generator includes two permanent magnets, or cores, 4 and 5. These permanent magnets, before being magnetized, are placed in the position, as best shown in Fig. 2, bearing against the inner flat surfaces of the pole pieces 2 and 3 and so separating them a proper distance so that the outside surface of the pole pieces 2 and 3 nicely fit the inside of the case 1. In order to retain the parts rigidly attached together, I pass metallic rivets through bores in each of the pole pieces and rivet over the ends. The metallic rivets, preferably brass, are designated 6 and 7 and the riveted-over ends are designated 8 and 9.

For my purposes I form pole shoes on each of the pole pieces 2 and 3. These pole shoes are designated 10, 11, 12 and 13 and are preferably formed integrally with the pole pieces 2 and 3.

Figure 10:
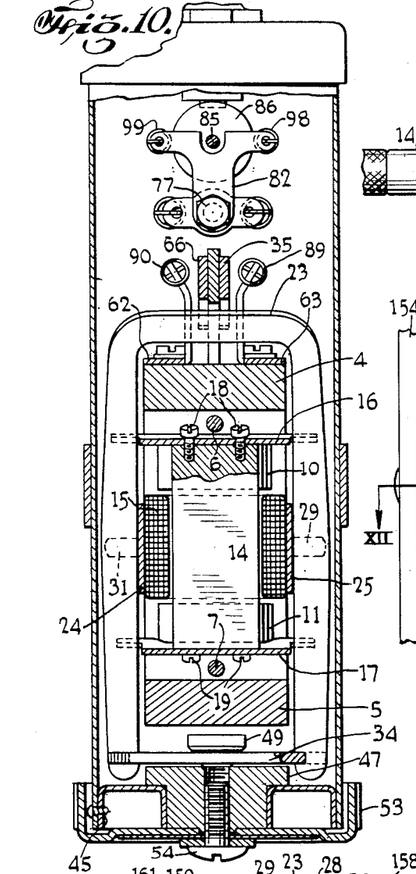
Fig. 10 is a cross sectional view of the device as shown by Fig. 2 but on a plane at a right angle to the plane of the cross sectional view shown by Fig. 2.

I position an armature 14 between the pole shoes. This armature has no pivot and is surrounded by the armature coil 15. The armature has, however, end plates 16 and 17 thereon, well shown in Fig. 2 and also shown in Fig. 10, which are attached to the armature in any suitable or appropriate manner as by means of screws, as 18 and 19. The armature end plates are extended out beyond the width or depth of the armature and are bifurcated, as at 20 and 21, as shown on one plate 17 in Fig. 12. Plate 16 is similarly bifurcated, the top bifurcation being shown at 22 in Fig. 6. The bifurcation on the end plates 16 and 17 receive a U-shaped leaf spring 23 (preferably laminated). This spring has its two legs spaced such a distance that one bears against the bottom of the bifurcations on one side of the armature and the other bears against the bifurcations on the other side of the armature, so that the spring centralizes the armature 14 within the armature coil 15.

In order to centralize the armature coil 15, plates 24 and 25, best shown in Fig. 12, are positioned, one on one side of the coil and the other on the other side of the coil. These plates are held in position by frictional engagement of small projections, as 26, which are received in cavities, as 27, in the pole pieces. Each of these coil-retaining plates 24 and 25 are also each provided with two spaced studs 28 and 29, 30 and 31. These studs are spaced so that the spring 23 fits nicely therebetween as well shown in Fig. 6.

The free ends of the legs of the U spring 23 rest in grooves 32 and 33 of a shifting bar 34, well shown in Fig. 5. The other end of the U spring 23 lies adjacent a trip 35 and in position to be engaged by the trip.

If the shifting bar 34 is moved to the left, as viewed in Fig. 2, the free end of the U spring 23 will be moved to the left while the other end of the spring 23 will be held by the trip 35 and the spring 23 will move from engagement from one side of the bifurcation 20 to the other side thereof, and the spring will be bent on a pin such as 31, and a pin, as 29, on the other armature coil-retaining plate below that shown in Fig. 6, and designated 28 in Fig. 12.

Figures 6, 7, 8, 9:
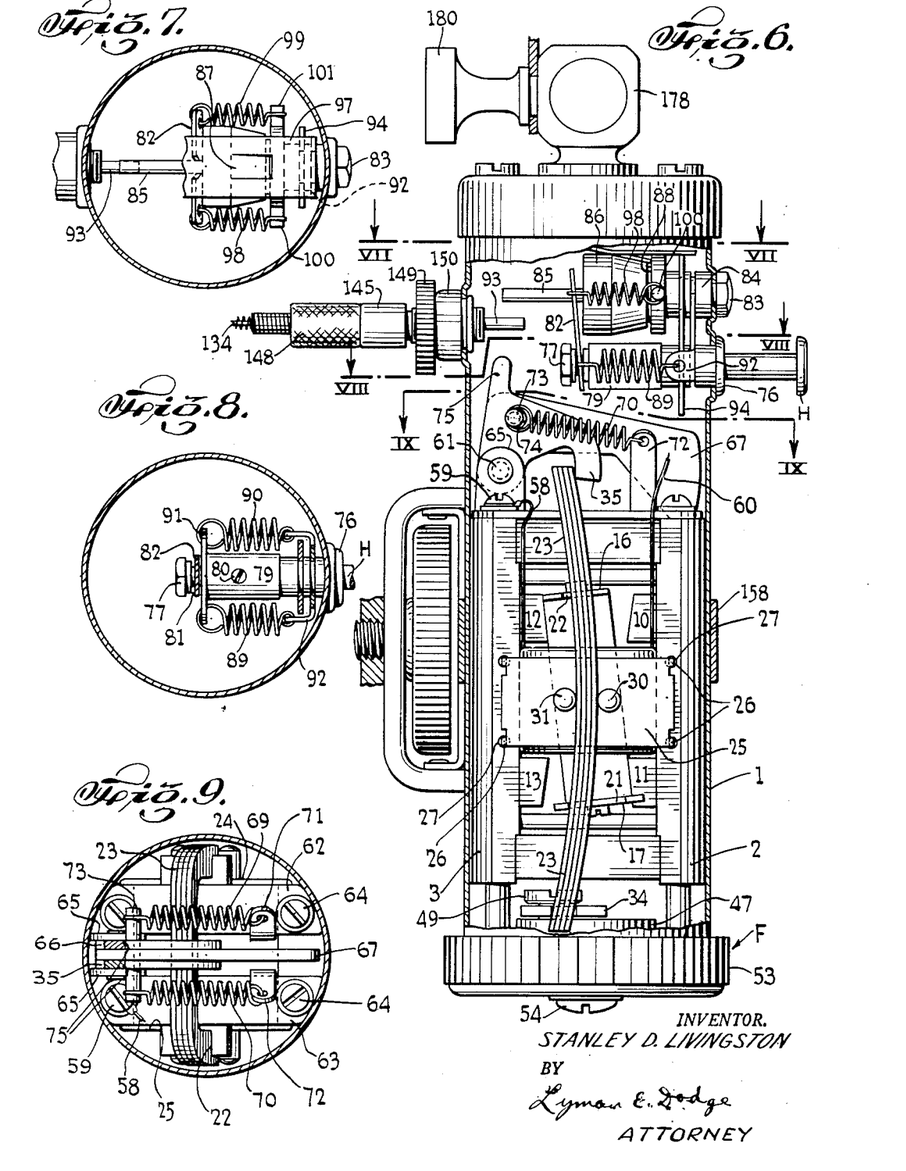
Fig. 6 is an elevational view of a device embodying my invention with a portion of the enclosing case broken away in order to more clearly show the internal construction.
Figs. 7, 8, and 9 are cross sectional views on the planes indicated by the lines VII—VII and VIII—VIII and IX—IX, respectively, viewed in the direction of the arrows at the ends of the line.

This movement of the spring will not disturb the position of the armature 14 as shown in Fig. 6, but if trip 35 is raised, then the spring 23 will cause armature 14 to reverse its position so as to lie against pole shoes 10 and 13 instead of against pole shoes 11 and 12. When this action occurs, a current is generated in armature coil 15 which may be utilized to ignite the light producing material in the lamp.

After the armature has been shifted from the position as shown in Fig. 6 to the position in which it lies against pole shoes 10 and 13, the spring 23 may be again bent, but this time by moving, shifting bar 34 to the right as viewed in Fig. 6 so that the free ends of the spring 23, as viewed in Fig. 6, will be moved to the right and the connected end will bear against the opposite side of the trip 35, and a movement of the trip to release the spring 23 will cause the armature to be returned to the position as shown in Fig. 6, but with the end of the spring 23 over to the right, as viewed in Fig. 6, that is, the position as shown in full lines in Fig. 2.

In order to provide for bending the spring for the purpose of moving the armature from one position to another, I form screw-threaded cavities on the pole pieces 2 and 3. These screw-threaded cavities are designated and best shown in Fig. 12, as 36, 37, 38 and 39. These screw-threaded cavities are adapted to receive the ends of screws as 40 and 41, best shown in Fig. 2.

Around each screw, as 40, is positioned a sleeve, as 42, whereby an end plate 43 may be retained between the end of the sleeves, as 42, and the under side of the head of the screws, as 40. This end plate 43 is formed with a curled-up edge 44 which just fits within the casing 1 and is attached to the casing in any suitable or appropriate manner as by drive screws, as 45, best shown in Fig. 10, placed at one or more points around the periphery of the curled-up portion 44. The end plate 43 is also formed with a central receiving passageway 45.

In order to provide for the movement of shift bar 34, I provide a hub 46 which just fits within the central passageway 45 and is formed with a flange as 47 which bears against the inside surface of the end plate 43. This hub is screw-threaded at 48 to receive a headed screw 49, there being a collar 50 between hub 46 and the other side of the hub or screw 49 which is received within an elongated slot 51 in shift bar 34. As screw 49 is positioned eccentrically in hub 46, if hub 46 is rotated, sleeve 51 acts as a cam and, operating in the slot 51, shifts shift bar 34 from the right to the left, as viewed in either Fig. 2 or 5. In order to have a definite stopping place for the rotation of hub 46, I form a slight cut-out portion 52 in each side of slot 51, so that the sleeve 51 will ride into this cut-out portion 52 on one side of the slot when the shifting bar is moved in one direction and into the cut-out portion on the other side of the bar when the shifting bar is moved in the opposite direction. As the sleeve 51 moves into the cut-out portion 52 it not only indicates the extent of proper movement but also serves as a slight stop or lock, so that the spring cannot force the shifting bar back to the position from which it was moved, when the force acting on 49 is removed.

In order to rotate the hub 46 I provide a manually operable knob 53 and attach the knob to hub 46 by means of a screw 54 threaded into a screw-threaded bore 55 of the hub, and in addition cause the end 56 of the screw 49 to have the thread removed for a short distance and project into a cavity 57 of the manually operable knob 53. By such construction the screw 54 holds the knob 53 tightly against hub 46, so that the end 56 of screw 49 is properly held in the cavity 57 of the manually operable knob 53.

It will be observed that the bending of spring 23 is accomplished by turning manually operable knob 53 intermittently in the same direction. The rotation of knob 53 continuously in one direction causes shift bar 34 to oscillate first from left to right and then from right to left. It is also to be observed that the closed end of the U spring 23 rests first on one side of trip 35 and then on the other side of trip 35.

The polarity of the permanent magnets 4 and 5 is such that the right hand end of each, as viewed in Fig. 2, would be both either a north or a south pole.

The magnetization of permanent magnets 4 and 5 is preferably accomplished by any usual or proper method after the assembly of the generator parts has been completed.

One end of coil 15 is connected by conductor 58 to screw 59 and so is connected to the casing and is what might be called the grounded wire. The conductor 60 leads from the other side of the armature coil 15 and is connected as will be hereinafter described.

The normal position of the generator parts is as shown in full lines in Fig. 2. One position of the bent spring 23 is shown in Fig. 6 in full lines. This is the position which the spring is made to assume, preferably, just prior to the time when it is desired to expose the photographic material in the camera and flash the lamp A.

The spring 23 is held in the bent position at one end by the trip 35 which is pivoted on pivot pin 61. In order to support the pivot pin 61, two plates are provided, one, 62, extending from pole piece 2 to pole piece 3 and the other, 63, likewise extending from pole piece 2 to pole piece 3 well shown in section in Fig. 10 and in side view in Fig. 2. Each of the plates 62 and 63 are attached to the pole pieces 2 and 3 by screws, as 64, passing therethrough and screw-threaded into the pole pieces. Each of the plates 62 and 63 is provided with a right angled projection as 65 in which the pivot pin 61 is supported.

The pivot pin 61, in addition to supporting the trip 35, also supports a precisely similar trip 66 which is spaced from trip 35 by the unlocking arm 67. This unlocking arm 67 is supported by pivot pin 61 and extends, as well shown in Fig. 2, so that its end 68 contacts the end of pole piece 2. The unlocking arm 67 is made of magnetic material and so is magnetically attracted to pole piece 2, but it does not form a shunt from pole piece 2 to pole piece 3 because the plates 62 and 63 are formed of non-magnetic material, such as brass, and the pivot pin 61 is raised by these plates some little distance from the end of field pole 3.

Figure 11:
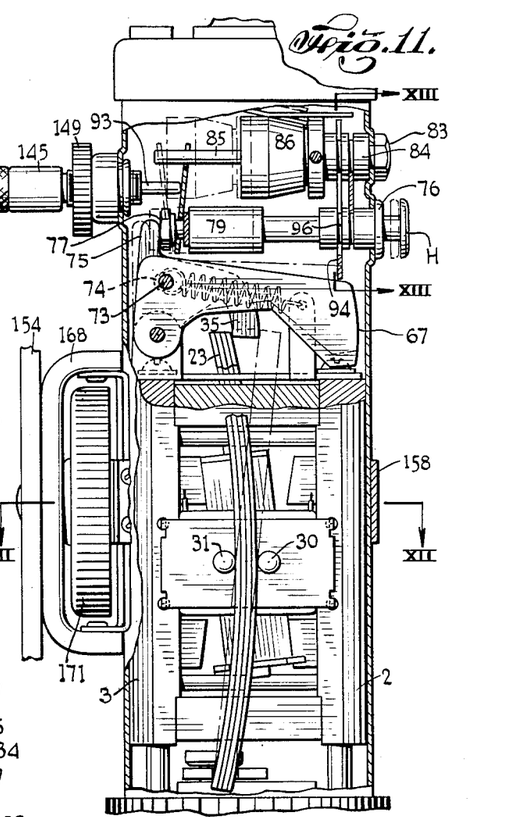
Fig. 11 is a view similar to Fig. 6, but showing some of the parts in an operated position.

The identical trips 35 and 66 and the unlocking arm 67 are all spring held in the position as shown in Fig. 2 by springs 69 and 70. One end of each of springs 69 and 70 is attached to upstanding arms on plates 62 and 63, that is, arms 71 and 72, as best shown in Fig. 9. The other ends of the springs 69 and 70 are attached to a pin 73 firmly attached to both trips 35 and 66 but which passes through a bore 74, best shown in Fig. 11, in trip arm 67. This bore is of predetermined size and is of a size sufficient to allow lost motion between trips 35 and 66 and unlocking arm 67, so that when the upper ends, as 75, of trips 35 and 66 are moved to the left, as viewed in Fig. 2, they have a slight movement before the pin 73 contacts the inside surface of the bore 74 and tends to move trip arm 67, that is, the upper ends of trip arm 75 will be moved to the position as shown in full line in Fig. 11 before the pin 73 contacts the inside surface of the through bore 74 to start movement of the locking arm 67. When this point is reached in moving trips 35 and 66, an outside resistance to further movement is immediately experienced because further movement of the upper ends of trips 35 and 66 must release unlocking arm 67 from its magnetic contact and attraction with pole piece 2, that is, in actuating trips 35 and 66 by manually operable member H such resistance is encountered at the moment pin 73 starts to move unlocking arm 67, that inevitably such a push will be given to manually operable pin H that inevitably a full stroke will be completed and the upper ends of trips 35 and 66 certainly push to dotted line position as shown in Fig. 11.

The trigger pin H projects outside of the casing 1, as shown in Fig. 2, and is supported by flange sleeve 76 inserted through a bore in the side of the casing and suitably attached thereto as by soldering. The trip pin H on its inner end is provided with an enlarged abutment which, in the form shown, is a hexagonal headed screw 77 which is threaded into a threaded bore 78 in the end of trip pin 8. Also positioned on the trip pin H is a spacer member 79 which is adjustable lengthwise of the trip pin and carries a set screw 80 by which the spacer 79 may be adjusted to different positions along the pin H and held in adjusted position. Proper adjusted position of 79 is such that there is a space 81 left between the under side of the head of screw 77 and spring plate 91 bearing on the end of spacer 79, such that a float plate 82 may be held loosely in such space so that it may assume positions on both sides of a perpendicular line drawn to the axis of pin H.

Adjacent to bushing 76 a screw 83 passes through the casing 1 and the screw threads thereof engage a sleeve 84 so that the sleeve 84 by means of screw 83 is drawn tightly against and held in place against the casing 1. The screw 83 has a projecting plain portion 85 upon which is slidingly mounted an inertia member 86 which is maintained in the position as shown in Fig. 2 by detent 87 resting against shoulder 88 of inertia member 86.

In order to normally retain trigger pin H in the position as shown in Fig. 2, springs 89 and 90 are employed, as best illustrated in Fig. 8. These springs 89 and 90 each engage at one end in the ends of a spring plate 91 which surrounds trigger pin H and bears against one end of spacer 79. The other ends of springs 89 and 90 engage a spring support 92 which is in turn supported by bushing 76 and sleeve 84. These springs 89 and 90 normally keep trigger pin H in its normal position, that is in the position as shown in Fig. 2, and offer a gentle resistance to the inward movement of that pin until the head of the screw 77 contacts and starts moving the trips 35 and 66 whereupon not only do the springs 69 and 70 resist the movement of the pin 8, but as it is further pushed in the pin 73 coming in contact with the inside surface of the through bore 74 of the unlocking arm 67, causes a further resistance due to the effort to move the end of unlocking arm 67 from its magnetic contact with the end of pole piece 2.

When trigger pin H is pushed inwardly it carries float plate 82 so that when the inner end of trigger pin H has pushed trips 35 and 66 to the full line position as shown in Fig. 11, and even to the dot and dash line position of trips 35 and 66, as shown in Fig. 11, float plate 82 will be in the full line position as shown in Fig. 11, that is slanting to the right as viewed in Fig. 11 and just touching the extreme inner end of shutter actuating terminal pin 93, and tensioning springs 98 and 99.

The movement inward of trigger pin H finally results in the movement of unlocking lever 67 so that it moves upwardly, as viewed in Fig. 11, and strikes against the end of slide bar 94 moving that slide bar upwardly, as viewed in Fig. 11. The slide bar 94 is bifurcated and spans bushing 76 resting in grooves, as 96, on each side thereof, and also spans sleeve 84 resting in grooves in each side thereof and extends so as to just touch detent arm 97 so that when slide bar 94 is pushed upwardly it pushes detent arm 97 and so moves detent 87 out from under shoulder 88 and then inertia member 86, impelled by springs 98 and 99, travels down the plain portion 85 of screw 83 and strikes float plate 82 forcing it against 93 and so actuating 93 to actuate the shutter of the camera. This occurs because springs 98 and 99 have one end attached to outstanding arms 100 and 101 attached to inertia member 86, and the other ends of the springs are attached one on one side and one on the other side of float plate 82, so that as float plate 82 was moved by the inward motion of trigger pin H carrying float plate 82 with it, the springs 98 and 99 were tensioned, and when the detent 87 was removed from shoulder 88 of inertia part 86, that inertia member was pulled down rapidly into the dot-dash line position as shown in Fig. 11, striking float plate 82 and moving that float plate from the position inclined to the right, as shown in Fig. 11, to incline to the left, as shown in dot and dash line in Fig. 11, and at the same time forcing shutter actuating terminal plunger 93 so as to actuate the shutter of the camera.

Upon the release of trigger pin H it is returned to its normal position, as shown in Fig. 2, by reason of the springs 89 and 90, and at the same time float plate 82 moves with it so as to move inertia member 86 to the normal position, as shown in Fig. 2.

Detent arm 97 and detent 87 are both part of a member substantially rectangular in general outline, as best shown in Fig. 4. This member 102 is fastened in any suitable or appropriate manner to a carrying plate 103, well shown in cross section in Fig. 2. This carrying plate has two threaded sleeves 104 and 105 attached thereto in any suitable manner as by spinning, and the member 102 is attached to carrying plate 103 in any suitable or preferred manner as by a screw 106 threaded into the sleeve 105.

The carrying plate 103 is attached to the case 1 in any suitable or appropriate manner, but preferably by forming several flats on the periphery thereof as 107, 108, 109 and 110, and just back of these slots and between the slots and the center of the plate forming cut-out portions, such as 111 and 112. Carrying plate 103 so formed may be inserted in the open end of case 1 and moved down on a line with orifices, as 113, formed through the wall of the case 1, and then a tool such as the end of a small screw-driver may be inserted in each of the slots 111 and, upon being twisted, will force the tiny projections, such as 114, into the through bores 113 in the case 1 and securely hold supporting plate 103 in place.

The supporting plate 103 also carries plug receiving insulating receptacles 115, 116 and 117 and an insulating bushing with a through bore 118. The metallic electrical conducting spring in receptacle 117 on the inner side of supporting plate 103 is attached, as by a wire 119 to the supporting plate 103, as by soldering at 120. A wire, as 121, is connected to the metallic spring of receptacle 115 and is passed out through the insulating bushing 118. Electrically conducting wire, as 122, is connected to the metallic spring of receptacle 116 and is also passed out through the insulating bushing 118. The wire 60 from one end of the armature coil 15 is also passed through the insulating bushing 118 then, after the plate 103 has been fastened in place, wires 121, 122 and 60 have their ends soldered together on the other side of the plate 103 from that viewed in Fig. 4. This method of making connections is done so that all wires will be fairly taut and not likely to get in the way of any of the mechanisms, that is, there is no necessity for leaving a certain length of wire to enable cover 103 to be removed from case 1 without disconnecting.

In order to make electrical connection to the lamp A when the case C is connected directly to the camera as shown in Fig. 1, a short electrical conductor 123 connected to one side of the filament in the lamp A is plugged into receptacle 115. The other side of the filament in the lamp is connected to ground or the other side of the armature coil through the metallic reflector B and the case C.

If one desires to ignite a flash lamp which is not mechanically connected to and electrically grounded to case C, then two conductors are plugged into receptacles 116 and 117 and connected to the lamp to be used as a flash lamp. The arrangement is done schematically in Fig. 15 in which the lamp is A, the grounded side is indicated at 124, the armature coil is 15, one side of which is grounded on the screw 59 represented by ground 125. The other side of the armature coil, by the conductor 60, is connected to receptacle 115 by wire 121 and to receptacle 116 by wire 122. Receptacle 117 is connected to ground by wire 119, while conductor 123 connects between one side of the filament lamp A and receptacle 115. The two wire cables connecting to 116 and 117 are illustrated by dotted wires 126 and 127. Although I have shown only one flash lamp A in connection with the camera of Fig. 1, it is to be understood that a plurality of flash lamps may be simultaneously ignited by my generator, that is, I may connect lamps 128, 129 and 130 between wires 126 and 127, in fact my plurality can, in the size now being manufactured, equal eight.

Figures 14, 15:
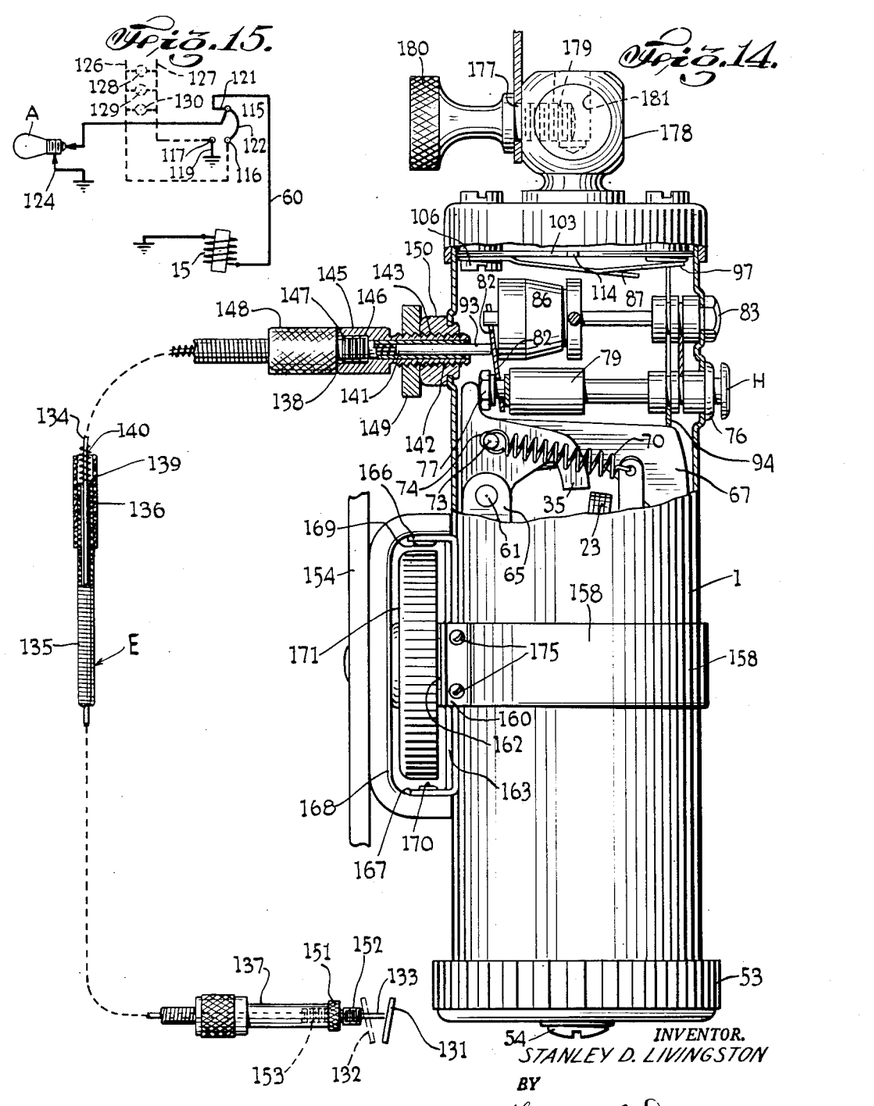
Fig. 14 is a view similar to Fig. 11, but showing the parts in a different operated position and further showing a shutter operating mechanism.
Fig. 15 is a diagrammatic view illustrating the electrical circuits made use of in my invention.

The connection E between the case C and the shoulder of the camera D is shown more in detail in Fig. 14 in which 131 represents the actuated position of the shutter and 132 illustrates the non-actuated position of the shutter, that is, terminal 133 moves from the position as shown in contact with 132 to the position as shown in which 132 has been moved to the position as shown by 131, and thereby the shutter is actuated. This movement is obtained, as hereinbefore explained by the movement of float plate 82 caused by inertia member 86 striking against it and moving 93.

93 is a terminal attached to wire 134. This wire 134 extends to and is connected to terminal 133 so that motion given to terminal 93 is connected directly to terminal 133. In order to have this wire flexible and well protected, it is covered throughout with the helical windings 135 and 136. Winding 135 extends from coupling member 137 to the winding from 136 and just a little beyond, that is, winding 136, for a short distance, is wound over winding 135. Winding 136 connects to coupling member 138. The end of a winding 135 within winding 136, as at 139, forms an abutment against which spring 140 rests. This spring at the other end abuts against the end wall 141 of terminal 93 so that terminal 93 and with it wires 134 is always pressed in a direction toward the float plate 82 and assumes a definite position beyond the screw-threaded end 142 of coupling 138 so that, depending upon the extent that 142 is screwed into threaded bushing 143, the terminal 93 projects more or less with the case 1.

The amount that the terminal 93 extends into the case 1 must bear a predetermined relation to the position of terminal 133 in regard to the shutter member 13, and this relation having once been ascertained and fixed, it is desirable to maintain it fixed but still be able to disconnect between the case C and the camera shutter. This is accomplished by making coupling 138 in two parts. One part, 145, bears the screw-threaded portion 142 and an internal thread 146 suitable for receiving the externally threaded projection 147 on the other portion 148 of the coupling. When it is desired to remove the flexible connecting shaft from the casing, member 148 is turned, and it turns relatively to winding 136, and as it is turned, properly screw-threaded 147 turns out of internal threads 146 thus leaving threaded end 143 connected to the case 1 and fixed in relation to the case by a threaded lock nut 149 which is screwed up against bushing 150, so that when the flexible shaft is removed the portions 145, 142 and 149 remain with the case 1 and so 147 may again be screwed into 145 and all parts will be in the position formerly determined upon. The connection at the shutter is made by member 151 which is screw-threaded on the end 152 so as to thread into the usual shutter operating mechanism.

The member 151 is also screw-threaded as at 153 into member 137 and member 137 rotates freely in relation to winding 135.

In order to secure the case 1 to a camera, I have provided, as one appropriate means, a bar 154, as shown in Fig. 1, which is attached in any suitable or appropriate manner as by screws 155 and 156 to the camera D. This bar 154 is provided with a screw-threaded through bore at 157 and by means of this the case is attached to the camera.

In order to make the attachment conveniently I provide a band 158, well shown in Fig. 12, having ears 159 and 160. These ears just contact with and match ears 161 and 162 of a bracket 163 which rests against the side of the case and extends lengthwise of the case as at 164 and 165 and at the extremities thereof are provided with right-angled bends 166 and 167 to which the guard member 168 is attached at each end as by rivets 169 and 170. Ears 159 and 161 and 160 and 163 are attached together by screws as 174 and 175.

Within the guard member 168 is the mounting knob 171. This mounting knob has rigidly attached thereto a threaded stud 172 which projects through a through bore 173 in the guard 168. The screw-threaded stud 172 may be screwed into the screw-threaded bore 157 in the bar 154 by turning the knob 171 and thereby the case will be securely held to the bar 154 and so to the camera D.

The reflector B is supported by arm 176 which is orificed at the end as at 177, as best shown in Fig. 14, and is supported on case 1 in any suitable or appropriate manner, but preferably by being attached to head knob 178 which has a cavity therein as shown at 179 which has an internal thread therein into which may be screwed the thumb nut 180 to fasten the support 176 of the reflector B. This allows the reflector B to be positioned as shown in Fig. 1 or it may be swung about thumb nut 180 as a pivot to various positions. The head knob 178 is also, as shown in Fig. 2, formed with a cavity 181 which is threaded so that thumb nut 180 may be screwed into it and so the reflector B may be positioned in another way by having its support 176 sustained by thumb nut 180 when thumb nut 180 is in screw-threaded cavity 181.

It is to be understood that the terminal 133, as shown in Fig. 14, may be used to operate various forms of shutters, that is, the self-cocking shutter or the non-self-cocking shutter. Depending upon which shutter is to be operated, suitable adjustment is made for the amount of protrusion of terminal 93 within the case 1.

Although I have shown a particular specific way of operating a shutter, that is by means of a flexible wire 134, nevertheless, I desire to have it understood that the form selected is merely illustrative but not exclusive, because I do not desire to exclude any means of communication between a member such as a float plate 82 and the shutter in a camera of whatever form.

It is to be understood that the particular instant at which a shutter of a camera furnished with light by means of what is known as a flash lamp, in order to secure optimum results, must be operated in relation to the peak of the curve representing the intensity of light given by the flash lamp is well known and understood. In my device I provide for this by causing the armature to fly from one position to another position and so generate an electric current, which electric current is used to ignite the material in a flash lamp and, depending upon just what is desired in the way of timing, I cause a train of mechanism to be set in operation by the same movement that actuates the armature and so arrange this train of mechanism that at the precise proper time, as desired and as is proper, I cause an opening of the shutter of a camera. It will be observed that when I push in manually operated trigger pin H that I first cause trip 35 to be moved a certain distance toward tripping position before I raise unlocking lever 67. It is obvious that the lost motion between the tripping triggers as 35 and 66 and the unlocking lever 67 may be made as desired. It is also evident that the amount of movement given to float plate 82 may be adjusted so that it will come closer to or farther away from terminal 93 at the moment the unlocking lever 67 strikes slide bar 94 to move detent 87. It is also evident that the mass of inertia member 86 may be varied and the stiffness of the springs, such as 98 and 99. An obvious and proper adjustment of all parts, and especially the protrusion of 93 in the case 1, will enable the device to be made to suit any situation to give any timing desired between the first flow of current through a flash lamp, as A, and the moment when the shutter of the camera is opened. It is to be particularly noted that the protrusion of terminal 93 into the case 1 is readily secured by reason of the threaded engagement between 145 and 150 and that when a proper adjustment is once obtained it may be made as permanent as desired by means of the lock nut 149.

The operation of the device when attached to a camera is extremely simple. It is necessary to first cock the spring 23 by rotating member 53. When the trigger pin H is pressed and the light is produced and the shutter opened and the mere withdrawal of the operating force from trigger pin H causes all parts to return to normal position, as shown in Fig. 2, so that the spring 23 may be again cocked for another operation.

Although I have particularly described one particular physical embodiment of my invention, nevertheless I desire to have it understood that the form selected is merely illustrative and does not exhaust the possible physical embodiments of the idea of means underlying my invention.

What I claim as new and desire to secure by Letters Patent of the United States is:

1. An electric generator, including, in combination: an elongated bar armature of magnetic material; end plates, one on each end of the armature, said end plate being longer than the armature is wide and extending beyond the armature on each side and each being bifurcated in the portion extending beyond the armature; a plate positioned on one side of the armature; a second plate positioned on the other side of the armature; means to support the plates; two pairs of abutments, one pair projecting from each plate outwardly from the armature; a U-shaped spring, one leg of the spring resting in the bifurcations on one side of the armature and the other leg resting in the bifurcations on the other side of the armature, one leg of the spring positioned between one pair of said abutments and the other leg positioned between the other pair of said abutments; means to flex the spring at the free ends of the legs; a trigger; a pivot for the trigger, said trigger positioned to engage the closed end of the U spring and prevent it from moving when the other end is flexed; manual means for moving the trigger and allowing the spring to unflex thereby moving the armature about an imaginary pivot; a fixed coil surrounding the armature; and means for causing a change in magnetic flux through the armature upon movement whereby a difference of potential is generated at the coil terminals.

2. An electric generator, including, in combination: two permanent bar magnet cores; two pole pieces, each extending from one permanent magnet to the other, and one abutting like magnetic poles and the other abutting like magnetic poles; four pole shoes, two projecting from each pole piece toward the other pole piece and arranged in opposing pairs; a first means for retaining the magnet cores and pole pieces in fixed relation; an armature of magnetic material positioned between the pole shoes and of a length such that one end cooperates with one pair of pole shoes and the other end with the other pair of pole shoes, the armature when at rest contacting diagonally opposite pole shoes; a second means for moving the armature from one diagonal position to the other; a third means for creating a bias in said second named means; a fourth means for releasing said second named means so that its bias may operate and move said armature from one diagonal position to the other; a stationary coil surrounding said armature whereby a difference of potential is generated at the coil terminals when the armature is moved from one diagonal position to the other.

3. An electric generator, including, in combination: two permanent bar magnet cores; two pole pieces, said pole pieces being separated by having the bar magnets interposed therebetween, one adjacent one end and the other adjacent the other end; means for clamping the pole pieces to the bar magnets; four pole shoes, two projecting from each piece toward the other piece and arranged in opposing pairs; an annular coil positioned between the pole pieces and between the two pairs of pole shoes; two plates, one on one side of the coil and the other on the other side of the coil and each bearing against and attached at each end to the pole pieces, whereby the coil is held in position; and means including a movable armature of magnetic material for cooperating with the pole shoes whereby a difference of potential is created between the terminals of the coil.

4. An electric generator, including, in combination: four pole shoes, said pole shoes arranged in separated pairs and each pair comprising opposing pole shoes; an elongated armature adapted to extend diagonally from the pole of one pair to the unlike pole of the other pair; two plates, one on each end of the armature, each of said plates extending beyond the side of the armature and being bifurcated, the bifurcation of the plate at one end presenting a smaller space than the bifurcation at the other end; an elongated spring member seated in the bifurcations of the plates and extending beyond the plates at each end, the spring being of such size that it just fits between the bifurcations at the plate where the bifurcation space is smaller; a manually operable trip engaging the spring at the end of the extension thereof beyond the plate with the smaller bifurcation, means substantially midway of the length of the armature in which the spring seats, said means being fixed; means engaging the end of the spring extending beyond the plate formed with the wider portion as a bifurcation whereby the spring may be flexed, pivoting on the above mentioned means, while held at the other end by the said trip, means for manually actuating the trip whereby the spring may unflex and in unflexing move the armature on an imaginary pivot midway of its length so that it will disengage two diagonally opposite pole shoes and engage two other diagonally opposite pole shoes, and means whereby movement of the armature will generate a difference of potential and whereby tendency to move the armature by the flexing of the spring is avoided until the trip is actuated.

5. An electric generator, including, in combination: a permanent magnet field; pole shoes; an elongated armature adapted to cooperate with the pole shoes; a leaf spring; means whereby the leaf spring causes movement of the armature and creates a difference of potential; a shifting bar, said shifting bar adapted to receive the one end of the leaf spring; means for oscillating the shifting bar whereby the spring is flexed, said means including a rotatable knob adapted for manual operation.

6. An electric generator, including, in combination; a permanent magnet field; pole shoes; a winding; an elongated armature adapted to cooperate with the pole shoes; a leaf spring; means whereby the leaf spring causes movement of the armature and creates a difference of potential at the terminals of the winding; a shifting bar, said shifting bar adapted to receive one end of the leaf spring, and formed with a slot formed with stopping cut-out portions on each side thereof; an eccentrically mounted member positioned within the slot of the shifting bar; means for rotating the eccentrically mounted member about a center whereby the shifting bar is oscillated and the spring flexed and whereby the eccentrically mounted member when moved into the cut out portion, indication is given that flexing is complete and the shifting bar is prevented from moving by the tension of the spring and means for manually operating the eccentrically mounted member.

STANLEY D. LIVINGSTON.

REFERENCES CITED

The following references are of record in the file of this patent:

UNITED STATES PATENTS

| Number | Name | Date |
| --- | --- | --- |
| 2,048,398 | Lasker | July 21, 1936 |
| 2,185,460 | Harris | Jan. 2, 1940 |
| 2,328,831 | Mendelsohn | Sept. 7, 1943 |